Nov. 16, 1971   L. A. URBAN ET AL   3,620,011
COMPRESSOR PRESSURE LIMITER FOR GAS TURBINE ENGINE
Original Filed March 29, 1968
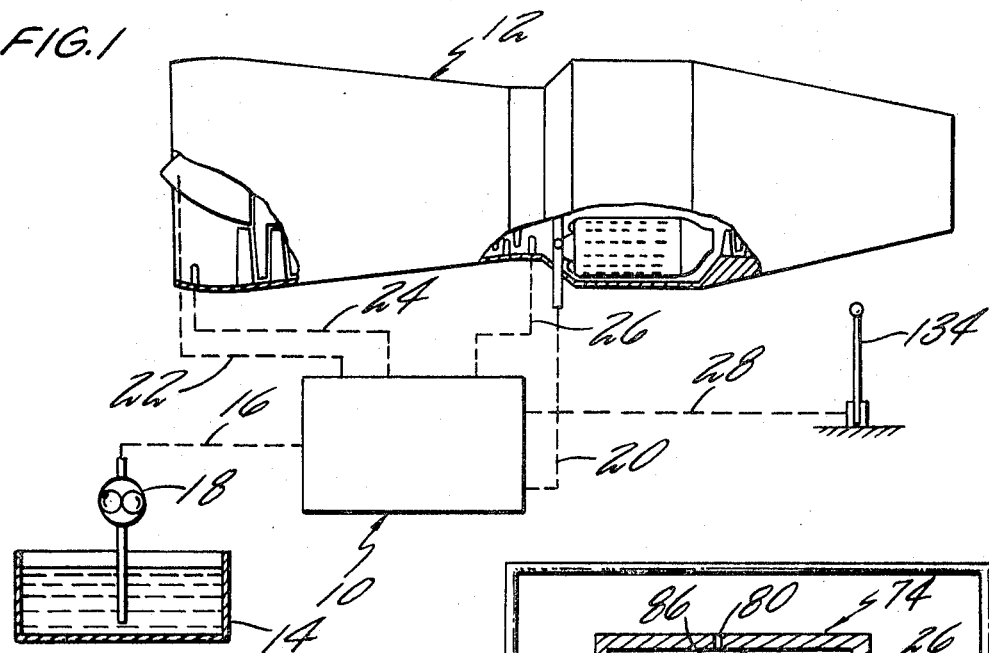
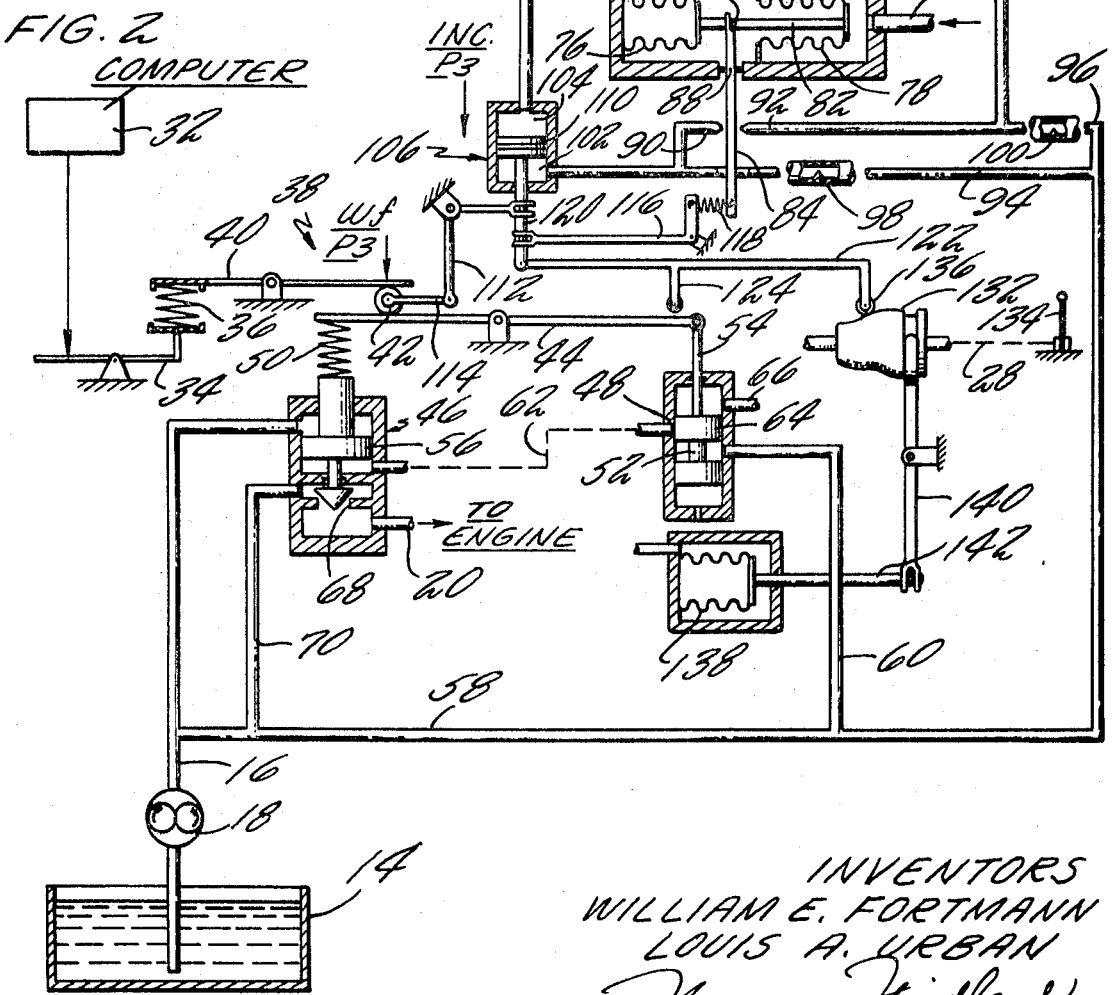
INVENTORS
WILLIAM E. FORTMANN
LOUIS A. URBAN
BY Norman Friedland
ATTORNEY

United States Patent Office

3,620,011
Patented Nov. 16, 1971

3,620,011
COMPRESSOR PRESSURE LIMITER FOR GAS TURBINE ENGINE
Louis A. Urban, Granby, and William E. Fortmann, Simsbury, Conn., assignors to United Aircraft Corporation, East Hartford, Conn.
Continuation of application Ser. No. 717,194, Mar. 29, 1968. This application Mar. 25, 1970, Ser. No. 20,469
Int. Cl. F02c 9/08, 3/06, 3/24
U.S. Cl. 60—39.28         14 Claims

ABSTRACT OF THE DISCLOSURE

Compressor discharge pressure of a gas turbine engine is limited by closing off the fuel metering valve at a velocity dependent on the magnitude by which the compressor discharge pressure exceeds a desired value. In this mode the fuel control becomes an integrating device and steady state is achieved by closing the loop on compressor discharge pressure through the engine. The limit may be reset by the power lever and may be altitude pressure or temperature biased.

---

This application is a continuation of application Ser. No. 717,194, filed Mar. 29, 1968, and now abandoned.

BACKGROUND OF THE INVENTION

This invention relates to fuel controls for gas turbine engines and more particularly to means for limiting the compressor discharge pressure.

As is well known in the art a typical fuel control for a jet engine senses compressor discharge pressure and utilizes this signal as a control parameter. It is also customary to provide means to limit this signal upon reaching a predetermined value so that the pressure does not exceed a value above the structural integrity of the component parts of the engine. A typical fuel control, as for example the one disclosed in the Best Patent No. 2,822,666, operates the fuel metering valve by generating a signal as a function of compressor discharge pressure and multiplying this signal with a scheduled signal for steady state, acceleration and deceleration. These scheduled signals are computed in terms of $W_f/P$ where $W_f$ equals fuel flow in pounds per hour and P is compressor discharge pressure and $W_f/P$ is equal to a function of speed error during steady state and speed and compressor inlet temperature during acceleration. These signals, as can be seen by referring to the Best patent, are applied to a multiplication linkage where the actual compressor discharge pressure signal and the desired $W_f/P$ signals are multiplied whereby their product, which is indicative of fuel flow, controls the fuel metering valve. Hence, it can be seen that all sensed parameters are ultimately fed into the multiplication linkage in order to control the amount of fuel fed to the engine. As is exemplified by the Best patent, it has been the customary practice to sense the compressor discharge pressure when it reached a predetermined value and modify the pressure signal fed to the multiplication linkage so as to cut back on fuel flow and hence abate such conditions. Additionally, it is customary to include feedback between the multiplication mechanism and the throttle valve so that the product signal produced by the multiplication linkage was seen as an error and the throttle valve proportionally moved until this error was wiped out.

These heretofore known systems like the one described above, however, have been limited in the precision with which they can achieve such compressor discharge pressure limits. In general, these systems make the value of the pressure limit dependent on the engine operational environment, the level of the particular engine's component efficiencies, and on the main engine control functional characteristics such as, for example, the shape and level of the droop lines and the acceleration schedules.

We have obviated these problems by providing a compressor discharge pressure limit that closes off the throttle valve or fuel metering valve of the fuel control at a velocity only dependent on the magnitude by which actual compressor discharge pressure exceeds the desired value. Hence, the fuel control becomes an integrating device and steady state is achieved by closing the loop on compressor discharge pressure through the engine. In this manner fuel flow in steady state conditions will assume whatever value is necessary to make the error in a desired maximum compressor discharge pressure equal to zero.

In the heretofore known fuel controls the compressor discharge pressure limit works through the scheduling mechanism for limiting fuel flow and hence, compressor discharge pressure. However, by working through the scheduling mechanism, all other parameters as mentioned above affect the output of the limit and hence, holding compressor discharge pressure at a constant limit becomes difficult if not impossible. This precludes, in the heretofore known controls, any precise resetting of the limit. By resetting compressor discharge pressure in response to only the desired variable and eliminating the adverse effect of the other variable as is done by this invention, it is possible to hold compressor discharge pressure at a given limit and likewise change the limit with a precise value of compressor discharge pressure. This may be very desirable since, for example, compressor discharge pressure at a given altitude is indicative of thrust; thrust can be precisely controlled within the limits of the compressor discharge pressure. Hence, according to this invention it becomes possible to have different limits in forward and reverse thrust operation and/or have those different limits vary as engine inlet temperature or pressure changes.

SUMMARY OF INVENTION

The primary object of the present invention is to provide an improved compressor discharge pressure limit.

In accordance with this invention sensed compressor discharge pressure overrides the multiplication system of a fuel control and closes off the fuel metering valve at a velocity dependent on the magnitude by which actual compressor discharge pressure exceeds the desired value.

A still further object of this invention is to apply a sensed compressor discharge pressure signal when it exceeds a predetermined value directly to the throttle valve to move it in a fuel limiting manner until the compressor discharge pressure returns to or below the limit value.

A still further object of this invention is to provide for a compressor discharge pressure limiter means to precisely reset the limit value manually and/or automatically in response only to the desired variable.

Other features and advantages will be apparent from the specification and claims and from the accompanying drawings which illustrate an embodiment of the invention.

BRIEF DESCRIPTION OF THE DRAWING

FIG. 1 is a schematic drawing illustrating a fuel control being connected to a gas turbine engine.

FIG. 2 is a schematic representation of a preferred embodiment of this invention.

DESCRIPTION OF THE PREFERRED EMBODIMENT

While the preferred embodiment is being described in connection with the axial flow jet engine, it is to be understood that the invention is not limited to any particular type of jet engine but is applicable to all types of gas turbine engines where it is desirable of limiting the gases discharging from the compressor at a predetermined pressure level. Furthermore, the preferred embodiment is being described in connection with the typical type of fuel contol exemplified by the one disclosed in U.S. Patent No. 2,822,666 wherein certain engine parameters are completed to produce a schedule signal indicative of $W_f/P$ as noted above. This signal is then multiplied by compressor discharge pressure ($P_3$).

As is shown in FIG. 1 the fuel control illustrated by the blank box generally indicated by numeral 10 is connected to a jet engine generally indicated by numeral 12 and receives fuel pressurized by a suitable pump schematically illustrated by reference numeral 18 from reservoir 14 via line 16. Fuel control 10 senses certain operating parameters of the engine and computes these parameters to a given schedule for regulating the quantity of fuel to be delivered to the burners via line 20. In this embodiment, speed is sensed via line 22, compressor inlet pressure is sensed via line 24, compressor discharge pressure is sensed via line 26, and power lever input is sensed via the connection 28 which is connected to the power lever 134. For a more detailed description of how the parameters are combined to obtain the scheduled signal, reference is hereby made to the Best Patent No. 2.822,666.

The invention can best be understood by referring to FIG. 2 which for the sake of convenience and simplicity refers to only those elements which are necessary to understand the operation of this invention. All other elements are deemed to be well known and are omitted herefrom for clarity. The scheduling portion or computing section of the fuel control is illustrated by blank box 32. Suffice it to say that this mechanism produces a scheduled signal $W_f/P$ for steady state acceleration and deceleration. For a more detailed description reference is hereby made to the Best Patent No. 2,822,666. It is therefore obvious that the $W_f/P$ schedule signal is transmitted through pivoted fulcrum lever 34 via the spring 36 to the multiplication mechanism generally illustrated by numeral 38. This multiplication linkage includes the fulcrum force bar 40, the movable rollers 42, and the fulcrum lever 44. Multiplication linkages are well known in the art and a more detailed description of multiplication linkage may be had by referring to Patent No. 2,822,666. Suffice it to say that the scheduled $W_f/P$ ratio signal produces a force via fulcrum bar 40 on rollers 42. The position of rollers 42 as will be described above is dictated by value of compressor discharge pressure. Thus, the moment arm taken about the pivot of lever 44 is indicative of the multiplication of $$\frac{W_f}{P} \times P_3$$

so that the output signal is indicative of $W_f$ or fuel flow. This signal is used to position the fuel metering or throttle valve 46 by virtue of pilot valve 48 and feedback spring 50.

It is apparent from the foregoing, therefore, that the signal produced by the multiplication linkage 38 positions the spool 52 in pilot valve 48 in accordance with any displacement of fulcrum lever 44. Displacement of lever 44 positions spool 52 through the connecting rod 54 which serves to direct servo pressure to and from half area servo piston 56 of the throttle valve 46. Thus pressurized fluid in line 16 is fed to pilot valve 48 through branch lines 58 and 60 where it is directed through pilot valve 48 to the half area servo piston through line 62 when land 64 moves upwardly. When land 64 moves downwardly, it connects line 62 to drain line 66 for bleeding fluid from the half area servo. The opposite end or the smaller diameter of servo piston 56 is continuously subjected to high pressure fluid. When the pilot valve is displaced and, in turn, positions piston 56, the throttle valve is positioned accordingly to change the fuel metering area 68 for regulating fuel to the engine which is admitted thereto through line 16, branch line 58 and branch line 70. Feedback spring 50 adjusts the force on fulcrum lever 44 for repositioning it and hence repositioning the spool 52 of pivot valve 48 so that land 64 in nontransient conditions is always in the position shown in the drawing which is the balanced or null position. The throttle valve at this point will be in a new position indicative of the product of $$\frac{W_f}{P} \times P_3$$

As was mentoned above, rollers 42 are positioned relative to the pivot of fulcrum lever 44 by virtue of sensed compressor discharge pressure in the engine by virtue of compressor discharge sensor generally illustrated by numeral 74. Sensor 74 comprises evacuated bellows 76 and sensing bellows 78 which has one chamber subjected to compressor dicharge pressure admitted thereto via line 26 and the other end subjected to ambient pressure admitted therethrough line 80. Evacuated bellows merely serves to reference the pressure to an absolute value. Link 82, therefore, is displaced as a function of compressor discharge pressure and moves pivotable lever 84 which is connected thereto by the abutting pin 86. Hence, lever 84 rotates about pivot 88 so as to be positioned relative to the nozzles 90 and 92. Pressurized fluid through line 58 is admitted to nozzle 90 via branch line 94 and pressurized fluid is admitted to jet pipe nozzle 92 via line 96. Resistors 98 and 100 are disposed in lines 94 and 96 respectively. The fluid discharging through nozzles 90 and 92 impinge on lever 84 which serves to restrict the flow therethrough and increasing the resistance to flow when moved closer to the end of the respective nozzles. Hence, when the flapper is spaced equally between the nozzles, the pressure drops across restrictors 98 and 100 will be equal and hence, maintaining the fluid in chambers 102 and 104 in piston actuator mechanism 106 at equal value. Hence, if, for example, compressor discharge pressure increases, the pressure sensed by bellows 78 positions lever 82 to the left rotating lever 84 about pivot 88 in a counterclockwise direction and moving it closer to nozzle 92 and away from nozzle 90. This serves to increase the pressure in chamber 102 and decrease the pressure in chamber 104 moving piston 110 in a downward direction. Bell crank 112 having one end rotatably connected to connecting rod 120 and the other end pivotally connected to link 114 which, in turn, is connected to roller 42 for imparting rectilinear movement thereto. This changes the moment arm on lever 44 and hence, the force input to pilot valve 48 for adjusting the throttle valve in a manner described above. Feedback indicative of the position of piston 110 is effectuated via the bell crank connection 116 and tension spring 118 disposed between the bell crank and flapper lever 84 for returning the flapper to the equidistant position between the ends of jet pipes 90 and 92. This is the balanced or null position, but noting that piston 110 is in a new position which is indicative of the sensed compressor discharge pressure.

The above describes well-known mechanisms used to control the flow of fuel to turbine types of power plants. However, it is common practice to reverse the actuation of rollers 42 so that it is translated by the scheduled $W_f/P$ ratio signal and rotated by compressor discharge pressure signal. The reversing of these parts should be of no avail to the understanding of this invention as will be described hereinbelow.

In accordance with this invention means are employed to limit the pressure of the gases discharging from the compressor from exceeding a predetermined value. While the invention is described in its preferred embodiment as utilizing compressor discharge pressure, it is to be understood that the invention is equally applicable to limiting any other pressure as may be desired. As was mentioned above relative to the description of the compressor discharge sensor, piston 110 always assumes a position that is indicative of the compressor discharge pressure being sensed. Thus, for every value of compressor discharge pressure there will be a given position of piston 110. As compressor pressure increases, the position of piston 110 will be at a lower point in its chamber. Connected to the piston through connecting rod 120 is link 122 which carries a downward projecting arm 124 which is shown in FIG. 2 as being separated from the top of fulcrum lever 44. As compressor discharge pressure exceeds a predetermined value, this arm bears against lever 44 and serves to rotate it about its pivot in a clockwise direction forcing pilot valve 48 in a downward direction. This connects the half area servo 56 to drain so that it in turn moves in a downward direction or toward the closing position to reduce the flow of fuel to the engine at a velocity dependent on the magnitude by which compressor discharge pressure exceeds the desired value. A reduction of fuel will occur so long as the compressor discharge pressure exceeds the limit to which the actuating mechanism is designed. A reduction of fuel flow results in a reduced compressor discharge pressure. When the gas returns to a tolerable pressure value, the arm 124 will again separate from fulcrum lever 44 and the normal functioning of the fuel control will resume.

The valve of the limit can be easily reset by rotating the cam 132 in response to the power lever 134. The cam follower 136 carried by lever 122 serves to set the gap between fulcrum lever 44 and the projecting arm 124 and hence, the compressor discharge pressure value at which the limiting means will override the normal control function.

It may be also desirable to bias this setting as a function of altitude. This may be necessary, as for example, where the landing of the aircraft is at a terminal whose altitude is at a different value than the takeoff terminal. Since the limit setting for one terminal may produce sufficient thrust and be within the pressure tolerance, that same setting would not be sufficient at the other terminal.

According to this invention the evacuated bellows 138 serves to sense ambient or altitude and produce a rotary motion on lever 140 by connecting rod 142 for translating cam 132 axially, against resetting the gap between the projecting arm 124 and fulcrum lever 44.

We claim:

1. A fuel control for a gas turbine engine including a source of fuel and movable fuel metering means regulating the flow of fuel from the source to the engine the improvement including:
  (a) sensing means for sensing the pressure of fluid in the engine downstream of compressor,
  (b) means responsive to said sensing means solely when the pressure downstream of the compressor exceeds a predetermined value for positioning said fuel metering means at a velocity dependent on the magnitude by which said pressure exceeds said predetermined value.

2. A fuel control as claimed in claim 1 including means responsive to the temperature at the inlet of said gas turbine engine for modifying said last mentioned means.

3. A fuel control as claimed in claim 1 including means responsive to the pressure at the inlet of said gas turbine engine for modifying said last mentioned means.

4. A fuel control as claimed in claim 1 including mechanical adjustment means for modifying said last mentioned means.

5. A fuel control as claimed in claim 4 wherein said mechanical adjustment means includes the power lever.

6. A fuel control as claimed in claim 1 including means movable in an axial direction in response to an engine operating parameter and in a rotary direction in response to a mechanical adjustment for modifying said last mentioned means.

7. A fuel control for a gas turbine engine having a compressor including
  (a) a source of fuel,
  (b) movable fuel metering means regulating the flow of fuel from the source to the engine,
  (c) regulating means responsive to a plurality of engine operating parameters for regulating said fuel metering means,
  (d) sensing means for sensing the pressure of the gases discharged from said compressor, and
  (e) means responsive to said sensing means solely when said pressure exceeds a predetermined value for positioning said fuel metering means independent of said regulating means at a velocity dependent on the magnitude by which the pressure of said gases exceeds said predetermined value.

8. A fuel control for a gas turbine engine including a source of fuel, fuel metering means regulating the flow of fuel from the source to the engine,
  means responsive to a plurality of parameters, including engine operating variables for producing a first signal indicative of a desired engine operation mode,
  sensing means for sensing the pressure downstream of the compressor of the engine,
  means responsive to said sensing means for producing a second signal, and
  means for combining said first signal and said second signal for controlling said fuel metering means, the improvement including
    (a) pressure limiting means responsive to said sensing means solely when the pressure downwstream of the compressor exceeds a predetermined value,
    (b) means responsive to said pressure limiting means for positioning said fuel metering means at a velocity dependent on the magnitude by which the pressure downstream of the compressor exceeds said predetermined value, and said last mentioned means over-riding said means for producing a first signal.

9. A fuel control for a gas turbine engine having a compressor including
  (a) a source of fuel,
  (b) movable fuel metering means regulating the flow of fuel from the source to the engine,
  (c) regulating means responsive to a plurality of engine operating parameters for regulating said fuel meterings means,
  (d) sensing means for sensing the pressure of the gases discharged from said compressor,
  (e) pressure limiting means responsive to said sensing means solely when said pressure exceeds a predetermined value for positioning said fuel metering means independent of said regulating means at a velocity dependent on the magnitude by which the pressure of said gases exceeds said predetermined value.

10. A fuel control as claimed in claim 9 including means responsive to the temperature or pressure upstream of said compressor for resetting said pressure limiting means for adjusting said predetermined value.

11. A fuel control as claimed in claim 10 including a power lever remote from said fuel control and means responsive to said power lever for further resetting said pressure limiting means for adjusting said predetermined value.

12. A fuel control for a gas turbine engine having a burner section, a compressor, and a turbine receiving the gas products from the burner section for driving the compressor and including,
    a source of fuel under pressure,
    connection means interconnecting the source of fuel and the burner section,
    valve means disposed in said connection means for regulating the amount of fuel delivered to said burner,
    control means for achieving steady-state engine operations to maintain compressor discharge pressure at a desired value,
    said control means including sensing means responsive to compressor discharge pressure,
    said control means also including scheduling means for scheduling a desired engine operating condition,
    and means responsive to said scheduling means and said sensing means for positioning said valve means at a velocity dependent on the magnitude by which said sensing means and said scheduling means differ.

13. A fuel control as claimed in claim 12 including means for biasing said scheduling means as a function of a pressure at the inlet of said gas turbine engine.

14. A fuel control as claimed in claim 12 wherein said scheduling means includes a power lever.

References Cited

UNITED STATES PATENTS

| | | | |
|---|---|---|---|
| 2,822,666 | 2/1958 | Best | 60—39.28 |
| 3,139,922 | 7/1964 | Peczkowski | 60—39.25 X |
| 3,196,613 | 7/1965 | Porter et al. | 60—39.28 |
| 3,246,682 | 4/1966 | McCombs, Jr. | 60—39.28 X |
| 3,426,777 | 2/1969 | Plummer | 60—39.28 X |
| 3,438,199 | 4/1969 | McGinnis et al. | 60—39.28 |
| 2,909,896 | 10/1959 | Porter | 60—39.28 |
| 2,796,733 | 6/1957 | Pearl | 60—39.28 |
| 2,941,358 | 6/1960 | Kuzmitz | 60—39.28 |
| 3,393,691 | 7/1968 | Longstreet | 60—39.28 |
| 3,023,575 | 3/1962 | Haase | 60—39.28 |
| 2,822,665 | 2/1958 | Best | 60—39.28 |
| 3,139,922 | 7/1964 | Peczkowski | 60—39.28 |

MARK M. NEWMAN, Primary Examiner

U.S. Cl. X.R.

60—39.28 T